Patented Aug. 30, 1932

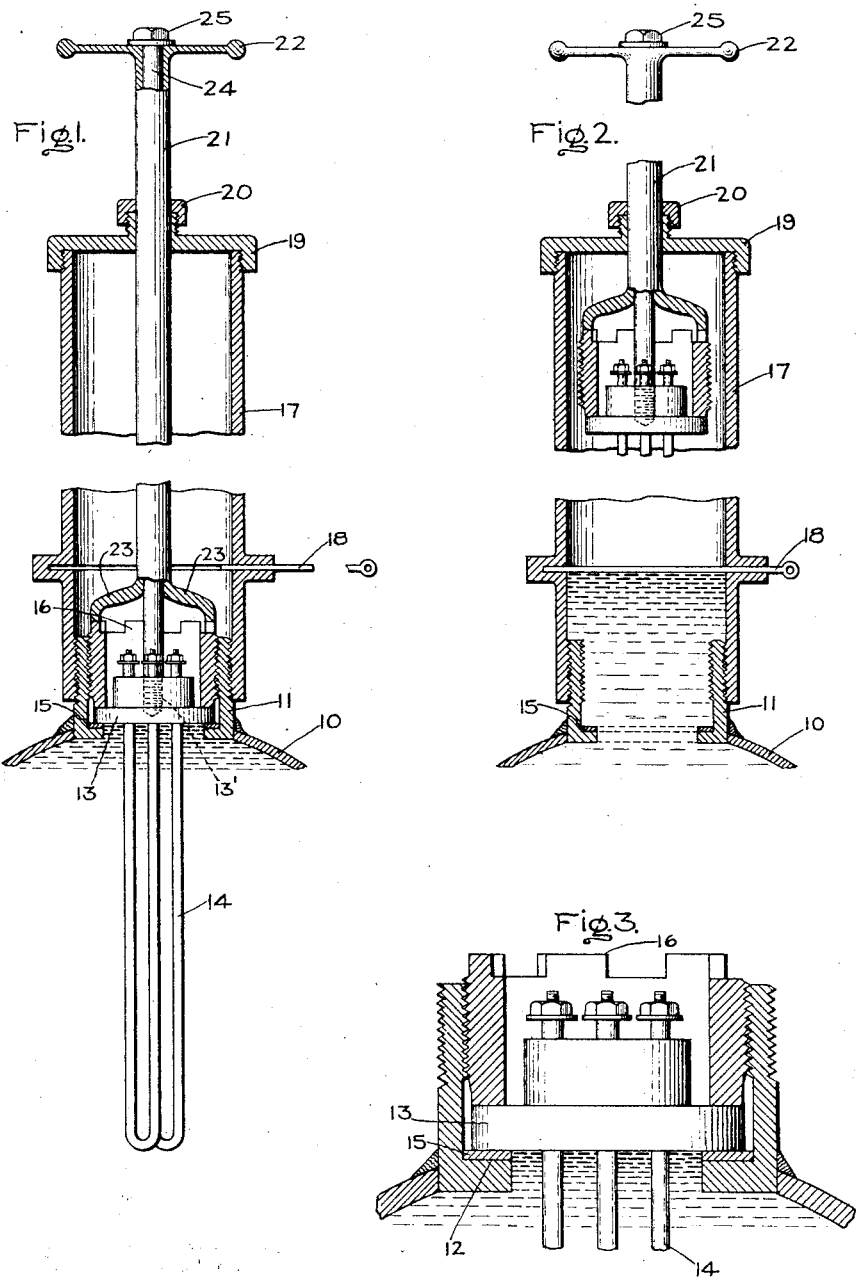

1,875,306

UNITED STATES PATENT OFFICE

SELDEN T. WILLIAMS, OF FOREST HILLS, NEW YORK, ASSIGNOR, BY MESNE ASSIGNMENTS, TO GENERAL ELECTRIC COMPANY, A CORPORATION OF NEW YORK

IMMERSION HEATER ATTACHMENT AND REMOVAL MECHANISM

Application filed April 17, 1930. Serial No. 445,174.

My invention relates to a tool, more particularly to a tool for removing and replacing an immersion heater unit in the wall of a tank or liquid container without appreciable loss of liquid.

A common method of heating water by means of electricity involves the use of the immersion type heater which has a filament heated by electricity extending into the water to be heated thereby. The filament is fastened to a base mounted in the wall of the heater tank and is provided with terminals to which conductors may be attached.

If it becomes necessary to replace these units due to burn out of the filament or other part of the immersion heat unit, or if the unit is to be replaced for other reasons, it is usually necessary to shut off the water supply to the hot water tank, blow off the tank and to drain the system of the water therein at least sufficiently to prevent damage from water which might escape from the hot water tank when the heater unit is removed from the wall thereof. It is also necessary where a plurality of heater units are used in a single tank to deenergize all the heater units to prevent damage to them when the tank is emptied. This results in a lack of hot water until the unit is replaced as well as a loss of the hot water in the tank. The other heater units are thereby rendered inoperative until the damaged heater unit can be replaced.

It is an object of my invention to provide a device for easily removing the heater unit.

It is an object of my invention to provide such a removing device which will eliminate the necessity for shutting off the water supply and which will prevent any substantial loss of the water during the replacing process.

It is a further object of my invention to provide a device by which a heater unit may be replaced during operation of the heating apparatus without the necessity of deenergizing the heating equipment.

Other objects will appear hereinafter.

In the preferred embodiment of my invention, I provide a casing adapted to be placed over the base of the spud which retains the heater unit element in operative position on the tank. The end of the casing which is placed over the base is open and the other end of the casing supports a spanner wrench for releasing the heater unit from its retaining means and a means for lifting the heater unit into the casing after it has been released from its retaining means. Within the casing is provided a gate means for closing off the open end of the casing. This permits the upper end of the casing to be opened and the heater unit withdrawn therefrom at the same time preventing the escape of water from the water heater apparatus while a new heater unit is being replaced by means of the spanner wrench and its associated parts. A new heater unit is then replaced in the base in the reversed manner set forth.

Referring to the drawing, Fig. 1 shows a cross section of the hot water tank heater unit and means for removing the heater unit.

Fig. 2 shows a cross section of the apparatus in another position.

Fig. 3 is a detailed drawing of the means for retaining the heater unit on its base.

Referring to Figs. 1 and 2, the tank or fluid receptacle 10 has integrally welded thereto the base or spud 11 for supporting the heater unit. The heater unit 13 provided with the heating element 14 is supported on the inner seat 12 of the spud and retained thereon by means of the crown nut 16. A suitable packing 15 is placed between the heater element and the seat of the spud. This packing is for the purpose of making a water-tight connection. It will be noted that the spud is threaded both on the outside and the inside.

A device for removing the heater unit and for replacing the damaged unit with a new unit consists of a casing 17 which is screwed on the outside of the spud. The casing is provided with the gate 18 for closing of the open end of the casing removable cap 19 which is threaded and screwed to the end of the casing 17. The cap 19 carries a bearing 20 in which is rotatably and slidably mounted the spanner wrench 21 provided with an operating handle 22 and the fingers 23 for engaging the crown nut 16 to unscrew the crown nut to release the heater unit. Extending down through the spanner wrench 21 and engaging the heater unit 13 in the screw threaded portion 13' thereof for lifting the unit is the member 24 which is provided with the operating head 25. In the position shown the casing forms a water tight covering for the base or spud 11.

The operation of the device is as follows: When it becomes necessary to replace a damaged heater unit, the casing 17 is placed over the spud and screwed thereon. The spanner wrench is forced to its lower position so that the fingers 23 engage with the crown nut. The member 24 is then engaged with the heater unit its end being engaged in the screw threaded portion 13' thereof by means of the operating head 25. The handle 22 of the spanner wrench is then rotated to unscrew the crown nut 23 from the spud. When the crown nut has been screwed back so as to release the heater unit, the spanner wrench and the member 24 are withdrawn into the casing so that the gate 18 may then be shut tight. Of course the casing becomes full with water but when the gate 18 is closed, it prevents the escape of additional water from the hot water tank. The cap 19 may then be unscrewed and the cap and its associated apparatus which includes the spanner wrench may be lifted from the casing. The damaged unit may then be replaced by a new heater unit and the new heater unit replaced into the water heater in the reverse manner.

It will thus be seen that I have provided a removing means for a hot water immersion heater unit whereby the heater unit may be removed without the necessity of any considerable loss of water or the necessity of shutting down the hot water supply. With my device, the operation of the hot water system may continue while the damaged unit is being replaced.

The embodiment of the invention illustrated and described herein has been selected for the purpose of clearly setting forth the principles involved. It will be apparent, however, that the invention is susceptible of being modified to meet the different conditions encountered in its use and I, therefore, aim to cover by the appended claims all modifications within the true spirit and scope of my invention.

What I claim as new and desire to secure by Letters Patent of the United States is:

1. An immersion fluid heater attachment and removal mechanism, comprising means for retaining an immersion heater unit in operating position, means cooperating with said retaining means to provide a liquid tight casing and having a device for releasing the immersion heater from said retaining means and for removing said immersion heater and means substantially preventing loss of any fluid while removing the heater unit.

2. In combination, a fluid receptacle, means for retaining an immersion heater unit in operating position on said fluid receptacle, means for removing said unit and cooperating with said retaining means to provide a liquid tight casing, means associated with said casing for releasing the immersion heater from the retaining means, and means for substantially preventing the loss of liquid when the heating unit is removed.

3. A tool for removing a fluid immersion heater unit from its base comprising a casing for engaging with the base, means associated with said casing to release and lift the unit from the base, and means substantially preventing the loss of any fluid when the unit is removed.

4. In combination, a fluid container, means for retaining an immersion heater unit within said container, a water tight casing for engaging said retaining means, means associated with said casing for releasing the heater unit from the retaining means, means for engaging the heater unit for lifting the unit from its operating position and means preventing the loss of water when the unit is removed from the casing.

5. A tool for removing an immersion water heater unit from its base in a fluid container comprising a casing adapted to be placed over the base with a water tight connection, means for releasing the unit from its base, means associated with said casing for substantially preventing the loss of any water when the unit is removed from the casing and means within said casing for removing the unit.

6. In combination, a fluid container, a base mounted in said container, means for retaining a heater unit within said base with a water tight connection, a water tight casing having an open end for receiving said base, means for releasing said retaining means, means within the casing for engaging the heater unit to lift it from the base, means for closing off the casing near said base to prevent the loss of water when the heater unit is removed from the casing, and means for permitting the removal of the heater unit from the casing.

7. In combination, a fluid container, a base mounted on said fluid container for receiving an immersion water heater unit, means for retaining the unit within the base, a casing open at one end and adapted to be placed over said base, said casing being closed at its other end and supporting a means for releasing the unit from the retaining means and lifting the unit within the casing, a means for closing the open end of the casing above said base to prevent the loss of water when the unit is removed from the casing and means permitting the removal of the unit from the closed end of the casing.

8. In combination, a fluid container, a base mounted on said container for supporting a heater unit, a crown jam nut for retaining the unit in water tight engagement with said base, a casing having an open end adapted to be placed over said base with a water tight fit, means supported by the other end of said casing and extending into the casing for engaging said crown nut to unscrew the same from the base, a means for securing the heater unit to lift it from its base, means for closing the open end of said casing above said base with a water tight fit to substantially prevent the loss of any water when the unit is removed from the casing and means permitting the unit to be removed from the casing.

9. An immersion water heater attachment and removal mechanism for removing a heater unit from a liquid container, comprising a base, a water heater immersion unit supported by said base, a crown nut for retaining said unit in water tight engagement with said base, a casing provided with a closed end and an open end, said open end being adapted to be placed over said base with a water tight engagement, a bearing support mounted at the closed end of said casing, means rotatably and slidably supported in said bearing and extending into said casing for engaging with said crown nut to unscrew the same, means extending within said nut engaging means for securing said unit to lift the same when said crown nut is unscrewed, gate means closing the open end of said casing to substantially prevent loss of any water when said unit is removed from said casing, said closed end and bearing being removable to permit said unit to be removed from said casing and a new unit to be substituted therefor.

10. In combination, a fluid receptacle, an electric immersion heater unit therefor, means for removably mounting the unit in the wall of the receptacle, a casing having an opening for receiving said unit into the casing and a second opening for permitting removal of the unit therefrom, means for establishing fluid tight connections between the first opening of the casing and the receptacle, means removably associated with the casing for closing the second opening therein, means associated with the casing for operating the removable mounting means to permit the removal of the unit into the casing, and means for closing the first opening in the casing after the unit is received therein.

11. In combination, a fluid receptacle having an internally and externally threaded spud in a wall thereof, an electric immersion heater unit having means cooperating with the internal threads of the spud for removably mounting the unit in the receptacle, a casing having at one end a threaded opening for engaging the external threads of the spud for receiving the unit into the casing, a removable cover for the other end of the casing, means rotatably mounted on the cover and extending through the casing for operating the removable mounting means of the unit and effecting removal thereof into the casing, and a gate valve mounted in the casing adjacent to the first opening for closing the same after the unit is received into the casing.

In witness whereof, I have hereunto set my hand this 10th day of April, 1930.

SELDEN T. WILLIAMS.